(12) United States Patent
LeGendre et al.

(10) Patent No.: US 9,021,220 B2
(45) Date of Patent: Apr. 28, 2015

(54) ORPHAN STORAGE RELEASE

(75) Inventors: David B. LeGendre, Tucson, AZ (US); David C. Reed, Tucson, AZ (US); Esteban Rios, Tucson, AZ (US); Max D. Smith, Tucson, AZ (US)

(73) Assignee: International Business Machines Corporation, Amonk, NY (US)

( * ) Notice: Subject to any disclaimer, the term of this patent is extended or adjusted under 35 U.S.C. 154(b) by 261 days.

(21) Appl. No.: 13/563,959

(22) Filed: Aug. 1, 2012

(65) Prior Publication Data

US 2014/0040586 A1 Feb. 6, 2014

(51) Int. Cl.
*G06F 12/12* (2006.01)
*G06F 12/02* (2006.01)

(52) U.S. Cl.
CPC .................................. *G06F 12/0253* (2013.01)

(58) Field of Classification Search
None
See application file for complete search history.

(56) References Cited

U.S. PATENT DOCUMENTS

| | | | | |
|---|---|---|---|---|
| 5,689,707 | A | * | 11/1997 | Donnelly ............................ 1/1 |
| 5,842,019 | A | * | 11/1998 | Kolawa et al. ................ 717/130 |
| 7,487,321 | B2 | * | 2/2009 | Muthiah et al. ............... 711/170 |
| 7,761,852 | B2 | | 7/2010 | Gilgen et al. |
| 8,112,528 | B2 | | 2/2012 | Capomassi et al. |

* cited by examiner

*Primary Examiner* — Gary Portka
(74) *Attorney, Agent, or Firm* — Terrile, Cannatti, Chambers & Holland, LLP; Stephen A. Terrile

(57) ABSTRACT

A method, system and computer readable medium that identify orphan storage and release the orphaned storage before application or system outages can result. More specifically, in certain embodiments, a method, system and computer readable medium periodically scan through common memory storage and identifies those areas that are no longer associated with a running task or have been allocated for longer than a running task with a matching task address. These areas are then identified as potentially orphaned storage locations.

15 Claims, 3 Drawing Sheets

ORPHAN STORAGE RELEASE

BACKGROUND OF THE INVENTION

1. Field of the Invention

The present invention relates in general to the field of computer operations and, more particularly to common memory orphan storage release.

2. Description of the Related Art

It is known to control storage systems using powerful host computer systems such as mainframe type computer systems. These host systems execute operating systems such as the z/OS operating system available from IBM. The z/OS operating system is well suited for continuation, high volume operation with high security and stability.

One issue encountered on operating systems such as the z/OS operating system relates to common (i.e., shared) storage region of memory. More specifically, when executing programs within the z/OS operating system, it is possible that storage obtained within the common storage region memory may be inadvertently left allocated without being freed. With this condition, the storage remains orphaned until the system is reinitialized, via e.g., an initial program load (IPL). Unlike private storage, storage obtained by a program in the common region of memory can be used by multiple address spaces and is not automatically freed when the program that obtained the memory ends execution. This orphaned storage can add up over time and can eventually cause the system to abnormally terminate (often referred to as an ABEND) due to the system no longer having available common memory storage.

Accordingly, it would be desirable to provide a mechanism that identifies orphan storage and releases the orphaned storage before application or system outages result.

SUMMARY OF THE INVENTION

In accordance with the present invention, a method, system and computer readable medium are provided that identify orphan storage and release the orphaned storage before application or system outages can result. More specifically, in certain embodiments, a method, system and computer readable medium are provided which periodically scans through common memory storage and identifies those areas that are no longer associated with a running task or have been allocated for longer than a running task with a matching task address. These areas are then identified as potentially orphaned. storage locations.

More specifically, in certain embodiments, the invention relates to a method, system and computer readable medium for recovering orphaned storage which include scanning through common memory storage; identifying an area. within the common memory storage as a potentially orphaned storage location; determining whether the potentially orphaned storage location should be excluded from being identified as potentially orphaned storage location; and, when the potentially orphaned storage location is not excluded from being identified as a potentially orphaned storage location, releasing the area within the common memory.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
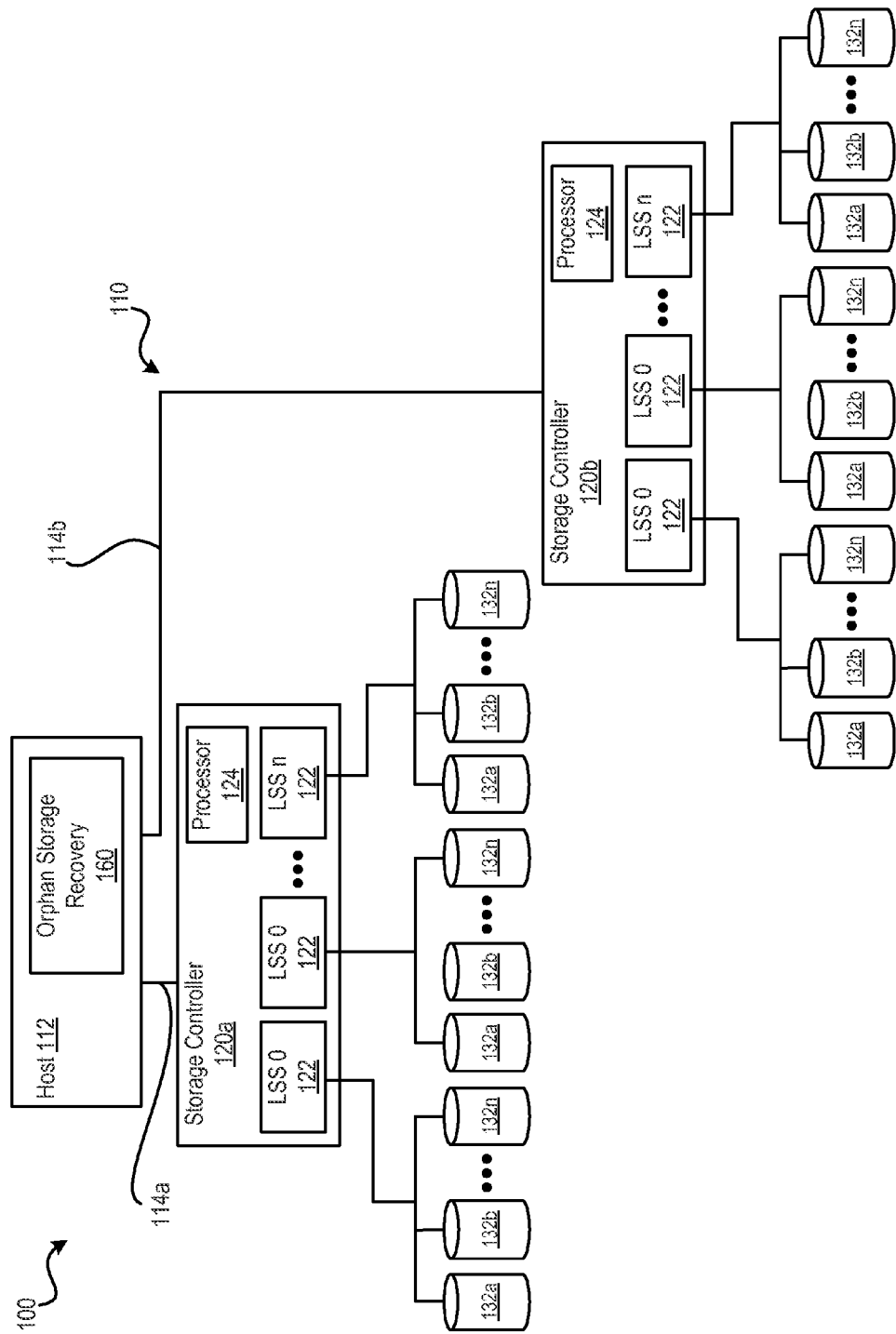
FIG. 1 is a block diagram showing a host computer in communication with a data storage system.

Many of the functional units described in this specification have been labeled as modules, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, among different processors, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification. may, but do not necessarily, all refer to the same embodiment.

Reference to a computer readable medium may take any form capable of causing execution of a program of machine-readable instructions on a digital processing apparatus. A computer readable medium may be embodied by a compact disk, digital-video disk, a magnetic tape, a Bernoulli drive, a magnetic disk, holographic disk or tape, a punch card, flash memory, magnetoresistive memory, integrated circuits, or other digital processing apparatus memory device.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Referring now to FIG. 1, a data processing system 100 comprises data storage system 110 and one or more host computers 112 (also referred to as hosts). The storage system 110 is in communication with host computer 112 via communication paths 114a, 114b. Communication paths 114a, 114b each comprise a communication link, where that communication link can be configured to comprise up to 256 logical pathways. The illustrated embodiment shows a single host computer. In other embodiments, data storage system 110 may be in communication with a plurality of host computers.

Although the system is described in terms of a storage control unit or "controller" and logical storage subsystems (LSS), the system may be implemented with other devices as well. The storage system 110 includes a storage system such as those available from International Business Machines under the trade designation IBM DS6000 or DS8000. In certain embodiments, the storage system 110 includes two storage controllers 120a and 120b, storage devices 122, such as hard disk drivers (HDDs). In certain embodiments, the storage system can further include an interface, such as an IBM Enterprise Storage Server Network Interface (ESSNI) or other interface.

The host 112 is coupled to the storage controller via appropriate connections through which commands, queries, response and other information are exchanged. The storage controller 120 may be configured with one or more logical storage subsystems (LSSs) 132 (e.g., LSS 0, LSS 1, . . . LSS n). Each LSS is assigned one or more storage devices 132.

The host computer 112 includes provision for execution of an orphan storage recovery module 160. The orphan storage recover module 160 enables a host 112 to identify orphan storage and release the orphaned storage before application or system outages can result. More specifically, in certain embodiments, the orphan storage recovery module periodically scans through common memory storage and identifies those areas that are no longer associated with a running task or have been allocated for longer than a running task with a matching task address. These areas are then identified as potentially orphaned storage locations.

Figure 2:
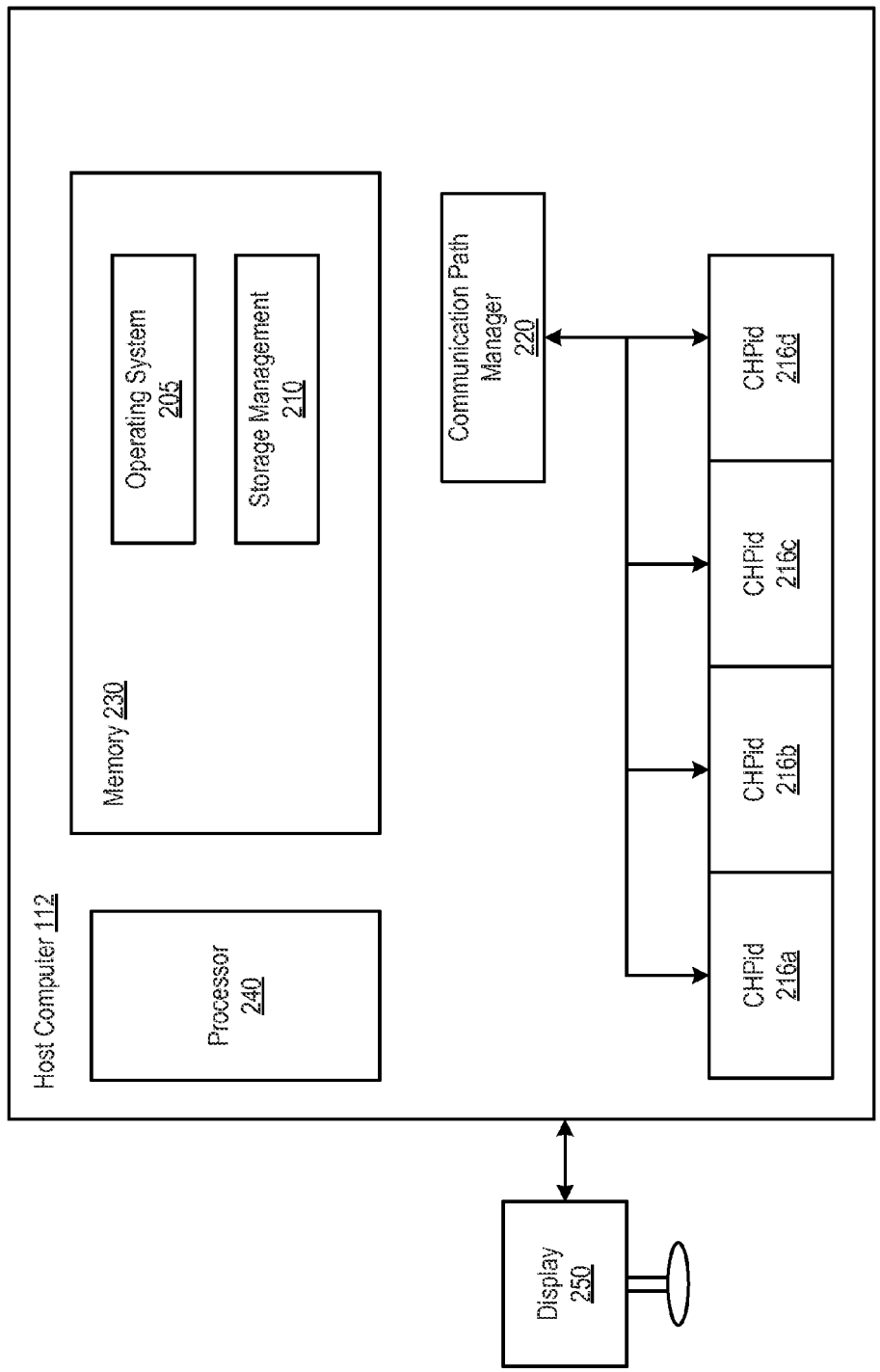
FIG. 2 is a block diagram showing a host computer communication path manager.

Referring to FIG. 2, the host computer 112 comprises a computer system, such as a mainframe, personal computer, workstation, and combinations thereof including an operating system 205 such as z/OS, Windows, AIX, Unix, MVS, LINUX, etc. (Windows is a registered trademark of Microsoft Corporation; z/OS and AIX are registered trademarks and MVS is a trademark of IBM Corporation; and UNIX is a registered trademark in the United States and other countries licensed exclusively through The Open Group.) The host computer 112 can further include a storage management program 210. The storage management program in the host computer 112 may include the functionality of storage management type programs known in the art that manage the transfer of data to a data storage and retrieval system, such as the IBM DBMS implemented in the IBM MVS operating system.

The host computer 112 can also comprise a plurality of channel path identifiers ("CHPids") (e.g., CHPids 216a, 216b, 216c, 216d). CHPids 216a, 216b, 216c, 216d, are physically interconnected to respective host adapters within the storage controller 120. The host computer 112 further comprises a communication path manager 220, where the communication path manager 220 is in communication with each of CHPids 216. In certain embodiments, the communication path manager 220 configures each of communication paths, to comprise up to 256 logical communication pathways.

The host computer 112 further comprises a memory 230 (e.g., a computer readable medium). The operating system 205 and the storage management program 210, are stored on the memory 230. The operating system 205 and the storage management program 210 include instructions which may be loaded on and executed by a processor 240. The host computer 112 may be interconnected with display device 250. The display device 250 may be integral with host computer 112 or may be remote from host computer 112. For example, the display device 250 may be located in a system administrator's office.

Figure 3:
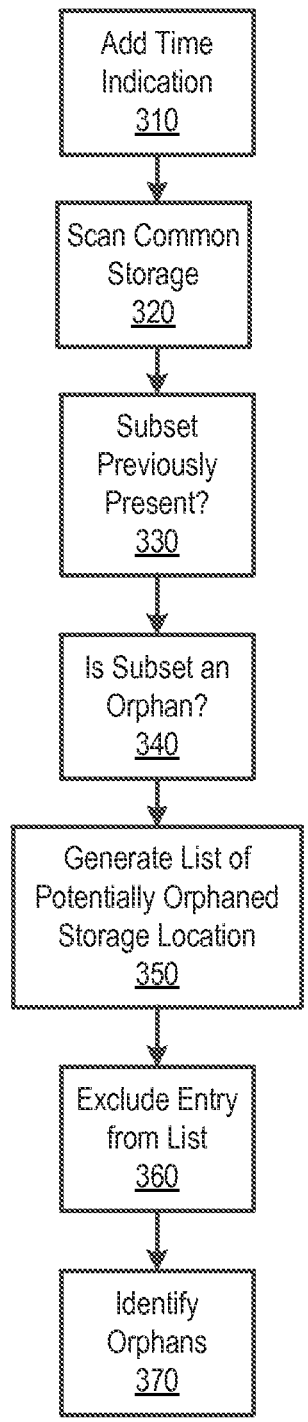
FIG. 3 shows a flow chart of the operation of an orphan storage recovery operation.

Referring to FIG. 3, a flow chart of an orphan storage recovery operation 300 is shown. In various embodiments, the orphan storage recovery operation 300 is provided by a program (e.g., orphan storage recovery module 160) which is external to the operating system 205 or is incorporated into the operating system 205.

More specifically, the orphan storage recovery operation 300 adds a time indication (e.g., a time stamp) to a storage Getmain request at step 310. The orphan storage recovery operation 300 then scans through the common storage at step 320. In certain embodiments, this scan is performed periodically. If a subset (e.g., a block) of common storage is identified as previously present (i.e., the subset of common storage was present during a previous scan) as determined by step 330, then the orphan storage recovery operation 300 attempt to determine whether the subset of common storage is an orphan subset of common storage.

More specifically, when determining whether the subset of common storage is an orphan subset, the orphan storage recovery operation 300 scans through an address space identifier (ASID) and searches for a task control block (TCB) that is identified as the owner of the subset of the storage that was identified as previously present. If the TCB with the address of the storage that was identified as previously present is located, then the orphan storage recovery operation 300 determines whether the TCB is the same TCB that originally obtained the subset of the storage that was identified as previously present. Because TCB addresses can be reused, it is not sufficient to merely determine that the TCB is the same as the one that originally obtained the storage. The orphan storage recovery operation 300 then accesses the time indication for when the TCB was created and compares this time indication with a time indication that shows when the storage was obtained. If the time indication of when the TCB was created is after the time indication that shows when the storage was obtained, then the orphan storage recovery operation 300 has an indication that the common storage was obtained under a different TCB and is potentially an orphan.

The storage range of the address of the storage that was identified as previously present is added to a potential orphan storage list at step 350, In certain embodiments, to improve performance, if an address has been found to exist through a certain number of scans (e.g., five scans) and is legitimately in use, then the orphan storage recovery operation 300 considers the identified storage range as belonging to a long running program. This identified block of storage is then excluded from the check process until the orphan storage recovery operation 300 completes a predetermined number of additional scans or until the orphan storage release program determines that the address space is no longer being used.

When the orphan storage recovery operation 300 completes scanning the common storage, the potential orphan storage list contains a list of potentially orphaned storage locations that have been identified. The orphan storage recovery operation 300 then proceeds with identifying entries within the potential orphan storage list which should be excluded at step 360. More specifically, the orphan storage recovery operation monitors the storage locations identified within the orphan storage list for program access. If another program accesses a storage location that is contained within the potential orphan storage list before the next scan by the orphan storage recovery operation 300 then that entry is removed from the orphan storage list. The orphan storage recovery operation 300 also generates a list of address spaces that intentionally maintain storage after a TCB is removed. This list is generated by those areas that are accessed again after the TCB has been freed and can also be generated by a parameter specified during a Getmain operation where a user can indicate an intention to have the storage remain after TCB termination. If the storage was obtained by an address space that is not on the exclusion list, then that storage location is identified as orphaned and is freed by the orphan storage recovery operation 300 at step 370.

Although the present invention has been described in detail, it should be understood that various changes, substitutions and alterations can be made hereto without departing from the spirit and scope of the invention as defined by the appended claims.

What is claimed is:

1. A method for recovering orphaned storage, the method comprising:
scanning through common memory storage;
identifying an area within the common memory storage as a potentially orphaned storage location;
determining whether the potentially orphaned storage location should be excluded from being identified as potentially orphaned storage location; and,
when the potentially orphaned storage location is not excluded from being identified as a potentially orphaned storage location, releasing the area within the common memory; and,
the scanning comprises scanning through a plurality of address space identifiers (ASIDs); and
the identifying searches for a task control block (TCB) that is identified as the owner of the subset of the storage that was identified as previously present.

2. The method of claim 1, wherein:
the scanning is performed periodically.

3. The method of claim 1, wherein:
if the TCB was identified as previously present, then the identifying determines whether the TCB is a same TCB that originally obtained the storage that was identified as previously present by accessing a time indication for when the TCB was created and comparing the time indication with a time indication that shows when the storage was obtained.

4. The method of claim 1, further comprising:
generating a potential orphan storage list of potentially orphaned storage locations;
monitoring storage locations identified within the potential orphan storage list for program access; and,
if another program accesses a storage location contained within the potential orphan storage list before a next scan is performed then removing an entry corresponding the storage location from the potential orphan storage list.

5. The method of claim 1, wherein:
if an address has been found to be present through a predetermined number of scans and is legitimately in use, then identifying the address as belonging to a long running program.

6. A system comprising:
a processor;
a data bus coupled to the processor; and
a computer-usable medium embodying computer program code, the computer-usable medium being coupled to the data bus, the computer program code comprising instructions executable by the processor and configured for:
scanning through common memory storage;
identifying an area within the common memory storage as a potentially orphaned storage location;
determining whether the potentially orphaned storage location should be excluded from being identified as potentially orphaned storage location; and,
when the potentially orphaned storage location is not excluded from being identified as a potentially orphaned storage location, releasing the area within the common memory; and wherein
the scanning comprises scanning through a plurality of address space identifiers (ASIDs); and
the identifying searches for a task control block (TCB) that is identified as the owner of the subset of the storage that was identified as previously present.

7. The system of claim 6, wherein:
the scanning is performed periodically.

8. The system of claim 6, wherein the computer program code further comprises instructions executable by the processor and configured for:
if the TCB was identified as previously present, then the identifying determines whether the TCB is a same TCB that originally obtained the storage that was identified as previously present by accessing a time indication for when the TCB was created and comparing the time indication with a time indication that shows when the storage was obtained.

9. The system of claim 6, wherein the computer program code further comprises instructions executable by the processor and configured for:
generating a potential orphan storage list of potentially orphaned storage locations;
monitoring storage locations identified within the potential orphan storage list for program access; and,
if another program accesses a storage location contained within the potential orphan storage list before a next scan is performed then removing an entry corresponding the storage location from the potential orphan storage list.

10. The system of claim 6, wherein:
if an address has been found to be present through a predetermined number of scans and is legitimately in use, then identifying the address as belonging to a long running program.

11. A computer-usable medium embodying computer program code, the computer program code comprising computer executable instructions configured for:
scanning through common memory storage;
identifying an area within the common memory storage as a potentially orphaned storage location;
determining whether the potentially orphaned storage location should be excluded from being identified as potentially orphaned storage location; and, when the potentially orphaned storage location is not excluded from being identified as a potentially orphaned storage location, releasing the area within the common memory; and wherein the scanning comprises scanning through a plurality of address space identifiers (ASIDs); and the identifying searches for a task control block (TCB) that is identified as the owner of the subset of the storage that was identified as previously present.

12. The computer-usable medium of claim 11, wherein:

the scanning is performed periodically.

13. The computer-usable medium of claim 11, wherein the computer program code further comprises instructions executable by the processor and configured for:

if the TCB was identified as previously present, then the identifying determines whether the TCB is a same TCB that originally obtained the storage that was identified as previously present by accessing a time indication for when the TCB was created and comparing the time indication with a time indication that shows when the storage was obtained.

14. The computer-usable medium of claim 11, wherein the computer program code further comprises instructions executable by the processor and configured for:

generating a potential orphan storage list of potentially orphaned storage locations;

monitoring storage locations identified within the potential orphan storage list for program access; and, if another program accesses a storage location contained within the potential orphan storage list before a next scan is performed then removing an entry corresponding the storage location from the potential orphan storage list.

15. The computer-usable medium of claim 11, wherein:

if an address has been found to be present through a predetermined number of scans and is legitimately in use, then identifying the address as belonging to a long running program.

* * * * *